US010337534B2

(12) United States Patent
Kuhlen et al.

(10) Patent No.: US 10,337,534 B2
(45) Date of Patent: Jul. 2, 2019

(54) PRESSURE MEDIUM DEVICE COMPRISING FLUIDIC CONNECTIONS WHICH ARE VARIABLE ON THE BASIS OF MOLDED SEALS

(71) Applicant: KNORR-BREMSE Systeme fuer Nutzfahrzeuge GmbH, Munich (DE)

(72) Inventors: Christian Kuhlen, Aschheim (DE); Karsten Schnittger, Munich (DE); Andreas Leinung, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 135 days.

(21) Appl. No.: 15/685,404

(22) Filed: Aug. 24, 2017

(65) Prior Publication Data

US 2017/0350422 A1    Dec. 7, 2017

Related U.S. Application Data

(63) Continuation of application No. PCT/EP2016/053308, filed on Feb. 17, 2016.

(30) Foreign Application Priority Data

Feb. 25, 2015    (DE) .......................... 10 2015 102 725

(51) Int. Cl.
*F15B 13/08* (2006.01)
*F16J 15/10* (2006.01)
(Continued)

(52) U.S. Cl.
CPC ........ *F15B 13/081* (2013.01); *F15B 13/0814* (2013.01); *F15B 13/0828* (2013.01);
(Continued)

(58) Field of Classification Search
CPC ............... F15B 13/081; F15B 13/0814; F15B 13/0828; F16J 15/104; Y10T 137/87885; Y10T 137/5109
(Continued)

(56) References Cited

U.S. PATENT DOCUMENTS 3,722,531 A * 3/1973 Verhart ............... F15B 13/0405
137/271
3,866,625 A    2/1975 Kemner et al.
(Continued)

FOREIGN PATENT DOCUMENTS

CN    101044326 A    9/2007
CN    202063129 U    12/2011
(Continued)

OTHER PUBLICATIONS

German-language Office Action issued in counterpart German Application No. 10 2015 102 725.9 dated Sep. 21, 2015 (5 pages).
(Continued)

*Primary Examiner* — Eric Keasel
*Assistant Examiner* — Kevin R Barss
(74) *Attorney, Agent, or Firm* — Crowell & Moring, LLP

(57) ABSTRACT

A vehicle pressure medium device in which a pressure medium flows, has a multilayer design which has at least two mutually contacting layers. A groove-shaped recess is arranged between a first chamber into which a first flow opening opens and a second chamber into which a second flow opening opens when viewed on a plane parallel to the layers. The groove-shaped recess has at least one opening for a fluidic connection between the first chamber and the second chamber on a plane parallel to the layers. A group of molded seals is provided for mounting between the two layers. A fluidic connection is either produced between the first chamber and the second chamber or not depending on
(Continued)

the molded seals which are mounted between the two layers and each of which is selected from the group of molded seals.

16 Claims, 7 Drawing Sheets

(51) Int. Cl.
  *F15B 13/00* (2006.01)
  *F16J 15/12* (2006.01)
  *F16J 15/14* (2006.01)
(52) U.S. Cl.
  CPC ....... *F16J 15/104* (2013.01); *F15B 2013/006* (2013.01); *F16J 15/122* (2013.01); *F16J 15/14* (2013.01)
(58) Field of Classification Search
  USPC ........................................... 137/269
  See application file for complete search history.

(56) References Cited

U.S. PATENT DOCUMENTS

| 5,086,803 | A | * | 2/1992 | Nakajima | ........... F15B 13/0817 |
| | | | | | 137/270 |
| 5,341,841 | A | * | 8/1994 | Schaefer | ............... F15B 13/081 |
| | | | | | 137/561 A |
| 5,600,953 | A | | 2/1997 | Oshita et al. | |
| 2007/0246109 | A1 | * | 10/2007 | Wolf, Sr. | ............ F16K 11/0743 |
| | | | | | 137/625.21 |
| 2007/0270006 | A1 | | 11/2007 | Herges | |
| 2016/0341306 | A1 | * | 11/2016 | Zeller | ................... F15B 13/081 |

FOREIGN PATENT DOCUMENTS

| DE | 2 303 474 A1 | 8/1974 |
| DE | 39 10 381 A1 | 10/1990 |
| DE | 100 57 379 A1 | 5/2002 |
| DE | 10 2010 019 307 A1 | 11/2011 |
| DE | 10 2010 044 910 A1 | 3/2012 |
| EP | 0 093 359 A1 | 11/1983 |
| EP | 0 389 777 A1 | 10/1990 |
| JP | 5-4185 A | 1/1993 |

OTHER PUBLICATIONS

International Search Report (PCT/ISA/210) issued in PCT Application No. PCT/EP2016/053308 dated Apr. 22, 2016 with English translation (5 pages).
German-language Written Opinion (PCT/ISA/237) issued in PCT Application No. PCT/EP2016/053308 dated Apr. 22, 2016 (6 pages).
Chinese-language Office Action issued in counterpart Chinese Application No. 201680012377.6 dated Jun. 4, 2018 with English translation (13 pages).
International Preliminary Report on Patentability (PCT/IB/338 & PCT/IB/373) issued in PCT Application No. PCT/EP2016/053308 dated Sep. 8, 2017, including English translation (German-language Written Opinion (PCT/ISA/237)) previously submitted on Aug. 24, 2017 (Nine (9) pages).
Japanese-language Office Action issued in counterpart Japanese Application No. 2017-545346 dated Aug. 20, 2018 with English translation (nine (9) pages).

* cited by examiner

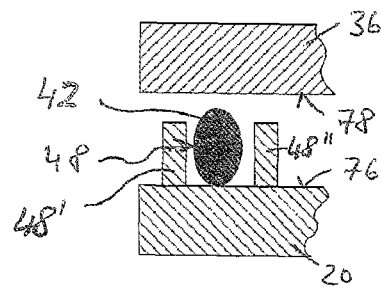 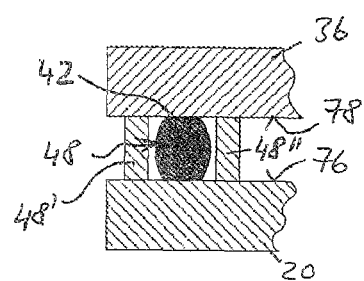
FIG. 9A  FIG. 9B
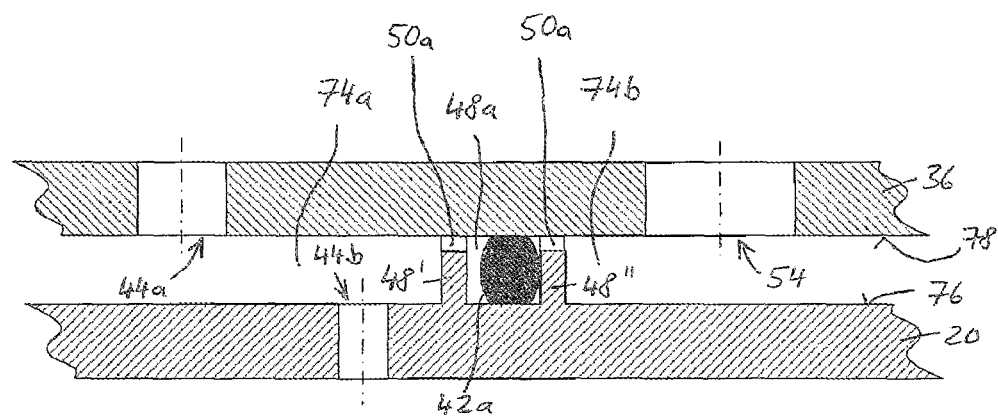
FIG.10

PRESSURE MEDIUM DEVICE COMPRISING FLUIDIC CONNECTIONS WHICH ARE VARIABLE ON THE BASIS OF MOLDED SEALS

CROSS REFERENCE TO RELATED APPLICATIONS

This application is a continuation of PCT International Application No. PCT/EP2016/053308, filed Feb. 17, 2016, which claims priority under 35 U.S.C. § 119 from German Patent Application No. 10 2015 102 725.9, filed Feb. 25, 2015, the entire disclosures of which are herein expressly incorporated by reference.

BACKGROUND AND SUMMARY OF THE INVENTION

The invention relates to a pressure medium device of a vehicle, in which pressure medium device a pressure medium flows, having a multi-layer construction which has at least two layers which make contact with one another, wherein, of at least two flow openings of in each case one flow duct for the pressure medium, both flow openings open out in a first surface of a first layer of the layers which make contact with one another, or a first flow opening opens out in the first surface and a second flow opening opens out in a second surface, which is situated opposite the first surface, of a second layer, which adjoins the first layer, of the layers which make contact with one another. At least one groove-like receptacle, which projects from the first surface and/or from the second surface, for a separating part of a molded seal arranged between the two layers is provided. The groove-like receptacle is, as viewed in a plane parallel to the layers, arranged between a first chamber, into which the first flow opening opens out, and a second chamber, into which the second flow opening opens out, wherein the first chamber and the second chamber are delimited at least by the first surface and by the second surface.

A pressure medium device of the above type is known for example from DE 39 10 381 A1 in the form of a manifold plate composed of multiple intermediate plates and end plates. In the case of said pressure medium device, there is arranged between two intermediate plates a molded seal which has disk-shaped closures for the closure of flow openings, which flow openings are formed in the two intermediate plates in each case perpendicularly to the plate plane and are aligned with one another. Depending on the design of the molded seal, it is possible for all three flow openings to be closed off by means of three closures, wherein then, a flow from a flow opening in one intermediate plate into the associated flow opening of the other intermediate plate is no longer possible, or, in any desired combination, only one flow opening or two flow openings are closed by means of closures correspondingly arranged on the respective molded seal. Accordingly, a group of molded seals is provided which have in each case a different number and/or different positioning of closures in order to close and open respectively particular flow ducts which extend through the intermediate plates and which open into the flow openings. This type of molded seal is expedient if flow ducts which extend through multiple intermediate plates and which run perpendicular to the plate plane are to be opened or closed in order to realize pressure medium switching configurations in a variable manner.

The present invention is based on the object of further developing a pressure medium device of the type mentioned above such that variants thereof can be produced as inexpensively as possible.

This and other objects are achieved according to the invention wherein:

a) the groove-like receptacle has at least one aperture for a flow connection between the first chamber and the second chamber in a plane parallel to the layers, and b) a group of at least two molded seals for installation between the two layers is provided, wherein a first molded seal from the group of molded seals has, at least in the region of the aperture, a separating part, which is received in the groove-like receptacle, for separating the first chamber from the second chamber, and a second molded seal from the group of molded seals is, at least in the region of the aperture, formed without such a separating part, wherein c) a flow connection between the first chamber and the second chamber is produced, or is not produced, in a manner dependent on the molded seal respectively selected from the group of molded seals and installed between the two layers.

Therefore, flow connections between different layers or within the same layer in a plane parallel to the two layers which are in contact, or between said layers, are configured in a variable manner. The flow then, for example, enters the first chamber from a flow duct through the first flow opening in the first surface of the first layer, through the aperture or the apertures in the groove-like receptacle for the molded seal selected from the group of molded seals and arranged between the two layers, which molded seal in this case has for example no separating part, and then into the second chamber and from there into the second flow opening in the first surface or in the second surface, in order to pass from there into the associated flow duct.

The groove-like receptacle then serves firstly for securing the molded seal or the separating part thereof in position, and secondly makes it possible, by means of the aperture or the apertures, for a flow connection between the chambers or flow openings to be realized.

If, by contrast, a molded seal which has a separating part in the region of the aperture or of the apertures has been selected from the group of molded seals and installed between the layers, no flow connection is produced between the first chamber and the second chamber or between the first flow opening and the second flow opening.

Here, it is assumed that a connection between the first chamber and the second chamber or between the first flow opening and the second flow opening can be realized exclusively through the aperture or the apertures in the groove-like recess, which aperture or apertures can be selectively closed in the case of a molded seal with a separating part in said region or opened in the case of a molded seal without a separating part in said region.

Therefore, with the invention, in a manner dependent on a selection of a molded seal from the group of predefined molded seals for installation or arrangement between the respective layers, a respective pressure medium switching configuration, in particular pneumatic switching configuration or hydraulic switching configuration, can be produced without the need for the layers themselves to be modified. This creates a very inexpensive possibility for obtaining a respectively different pressure medium switching configuration, in particular pneumatic or hydraulic switching configuration, merely by exchanging a molded seal. The invention is therefore advantageous in particular in the production of variants of the pressure medium device.

Advantageous refinements of and improvements to the invention are possible by means of the measures specified herein.

It is particularly preferable if at least one of the layers is of plate-like form. In this way, the pressure medium device can be of flat construction. In a refinement, at least one of the layers constitutes a housing or a housing component of the pressure medium device. A housing or a housing component is to be understood to mean a component or an assembly which has an outer surface which makes contact with the surroundings. This need not imperatively be a shell-shaped, cylindrical, rectangular or cuboidal component with a closed or open interior space. Rather, use may be made here of any housings or housing components, including plate-like housing components, which accommodate, bear or at least partially enclose components, assemblies or connectors of the pressure medium device, such as for example solenoid valves or relay valves.

In one refinement, the molded seal is held under preload between the first surface and the second surface or between the first layer and the second layer. Said preload then contributes to the sealing action between the chambers, wherein the molded seal and in particular the separating part thereof elastically deform.

It is particularly preferable if the separating part is of web-like form and, separating the first chamber from the second chamber, connects sections of an encircling ring part, which surrounds at least the first chamber and the second chamber, of the molded seal to one another. Said sections of the ring part which are connected to one another by the separating part are preferably situated opposite one another.

In one refinement, the ring part may be formed in one piece with the separating part and formed for example as a unipartite elastomer. The ring part may also be received in an encircling groove-like receptacle which projects from the first surface and/or from the second surface.

In particular, multiple chambers may be provided between the two layers, which chambers are separated from one another or connected to one another in each case by a present or absent separating part of a molded seal selected from the group of molded seals. A single molded seal may therefore also have multiple separating parts.

It is particularly preferable for the pressure medium to be formed by compressed air. Then, the pressure medium device is preferably formed by a compressed-air supply device for vehicle compressed-air systems, comprising, as components or assemblies, at least one air dryer device with an air dryer cartridge, a valve device with a multi-circuit protection valve and possibly further valves, a pressure limiter, open-loop and closed-loop control electronics, and multiple layers or housing components in or on which the abovementioned components or assemblies are accommodated. The layers or housing components are then layers or housing components in the abovementioned sense. With the group of molded seals, it is then possible for different variants of compressed-air supply devices to be realized with little outlay.

It would alternatively also be possible for the pressure medium device to be a pneumatic or electropneumatic brake device, a pneumatic or electropneumatic air suspension device, or a pneumatic or electropneumatic door actuation device.

The invention also relates to a vehicle, in particular a commercial vehicle, comprising a pressure medium device as described above.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 9A/9B show a cross-sectional illustration of the compressed-air supply device with a molded seal in the not yet fully installed state and in the fully installed state.

FIG. 10 shows a cross-sectional illustration of the compressed-air supply device according to a further embodiment transversely with respect to a groove which receives a separating part of a molded seal.

DETAILED DESCRIPTION OF THE DRAWINGS

Figure 1:
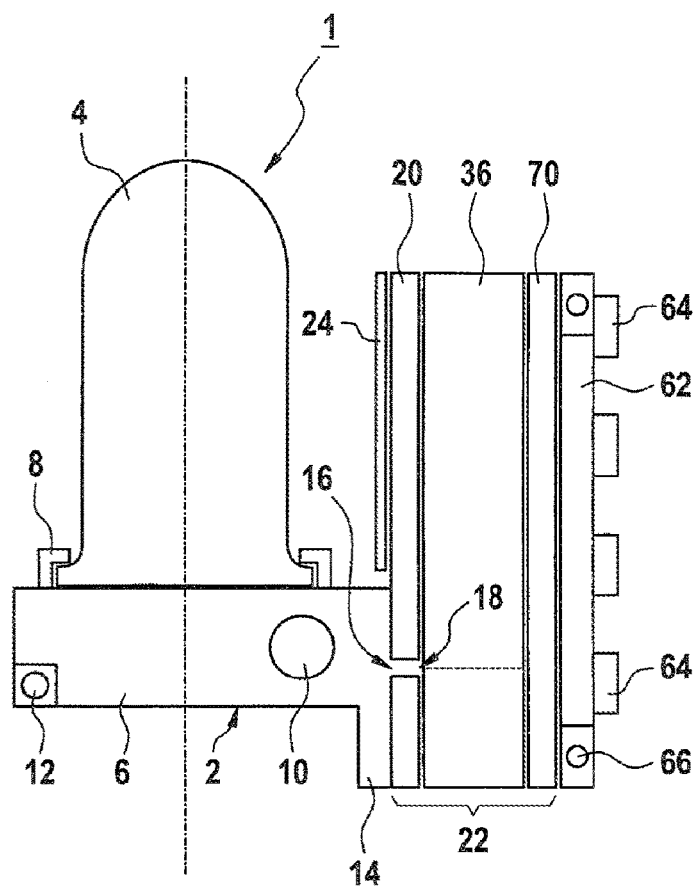
FIG. 1 shows a highly schematic side view of a compressed-air supply device as a preferred embodiment of a pressure medium device according to the invention.

The compressed-air supply device 1 shown in FIG. 1, as a preferred embodiment of a pressure medium device according to the invention, is arranged on a commercial vehicle and serves for the supply of compressed air to compressed-air consumers such as a pneumatic or electropneumatic service brake device, parking brake device, air suspension device and/or door actuation device.

The compressed-air supply device 1 has an air dryer device 2 with an air dryer cartridge 4 which is fastened in releasable and exchangeable fashion to a first housing 6, which accommodates further structural elements of the air dryer device 2, such as for example a check valve (not visible here).

The first housing 6 is for example composed of aluminum and is produced by diecasting. The air dryer cartridge 4 is releasably fastened to the first housing 6 by means of a fastening apparatus 8, for example a bayonet fastener. The components of the bayonet fastener 8 are likewise composed of metal, as are all of the connectors of the first housing 6, such as for example a connector 10 for a compressor which delivers compressed air. The connector 10 for the compressor consists for example in a pipe stub formed integrally with the first housing 6 by primary forming, in the opening of which pipe stub there is formed an internal thread for a corresponding external thread of a fitting of a compressor line. Furthermore, on the first housing 6, there is formed a fastening apparatus 12 for the fastening of the compressed-air supply device 1 to a frame of the commercial vehicle, for example in the form of one or more threaded eyelets. The functioning of an air dryer device 2 of this type is well known and therefore will not be discussed in any more detail here. Furthermore, it is also preferable for a pressure limiter or closed-loop pressure controller to be arranged in the first housing 6, which performs closed-loop control of the pressure in the downstream compressed-air vessels or pressure circuits.

The first housing 6 has a connector plate 14 which has for example been formed in one piece with said first housing by primary forming as an aluminum diecast article and in which connectors in the form of at least one flow opening 16 are formed. Said flow opening 16 is aligned with a corresponding flow opening 18 of a first valve block 20 as housing component of a second housing 22, which is connected at least to the connector plate 14 of the first housing 6, wherein said connection will be discussed in more detail further below. Through the inter-communicating flow openings 16, 18, the compressed air that is delivered by the compressor and dried in the air dryer device 2 passes into the first valve block 20 and into the second housing 22. An additional standing plate 24, which is for example coplanar with respect to the connector plate 14, can strengthen or stiffen the connection between the first housing 6 and further housings such as the second housing 22. The standing plate 24 is in this case likewise manufactured from metal, for example from steel.

The first valve block 20, which preferably constitutes an injection-molded part composed of plastic, forms one housing component of multiple housing components which together form the second housing 22. Said first valve block 20 is, more specifically, a part of a valve device 26 which is accommodated in the second housing 22 and which comprises, inter alia, a multi-circuit protection valve, in particular a four-circuit protection valve, and further valves such as for example solenoid valves, relay valves and shuttle valves. Circuit separation between the compressed-air consumer circuits connected to the compressed-air supply device 1, such as service brake circuit I, service brake circuit II, parking brake circuit and secondary consumer circuit, is realized by means of the multi-circuit protection valve or the flow transfer valves. Not least, the electronic open-loop controller and the (solenoid) valves of an electropneumatic parking brake device and/or of an electropneumatic air suspension device of the commercial vehicle may also be accommodated in the second housing 22.

The first valve block 20 has, for example, first valve domes 28 in which valve bodies 32, which interact with valve seats 30, of seat valves of the valve device 26 are movably guided. The valve bodies 32 can be seen individually in the exploded illustration of FIG. 3, and are preloaded in the closing or opening direction of the respective seat valve by means of compression springs 34. The valve block 20 may however also be formed without valve domes 28.

Figure 5:
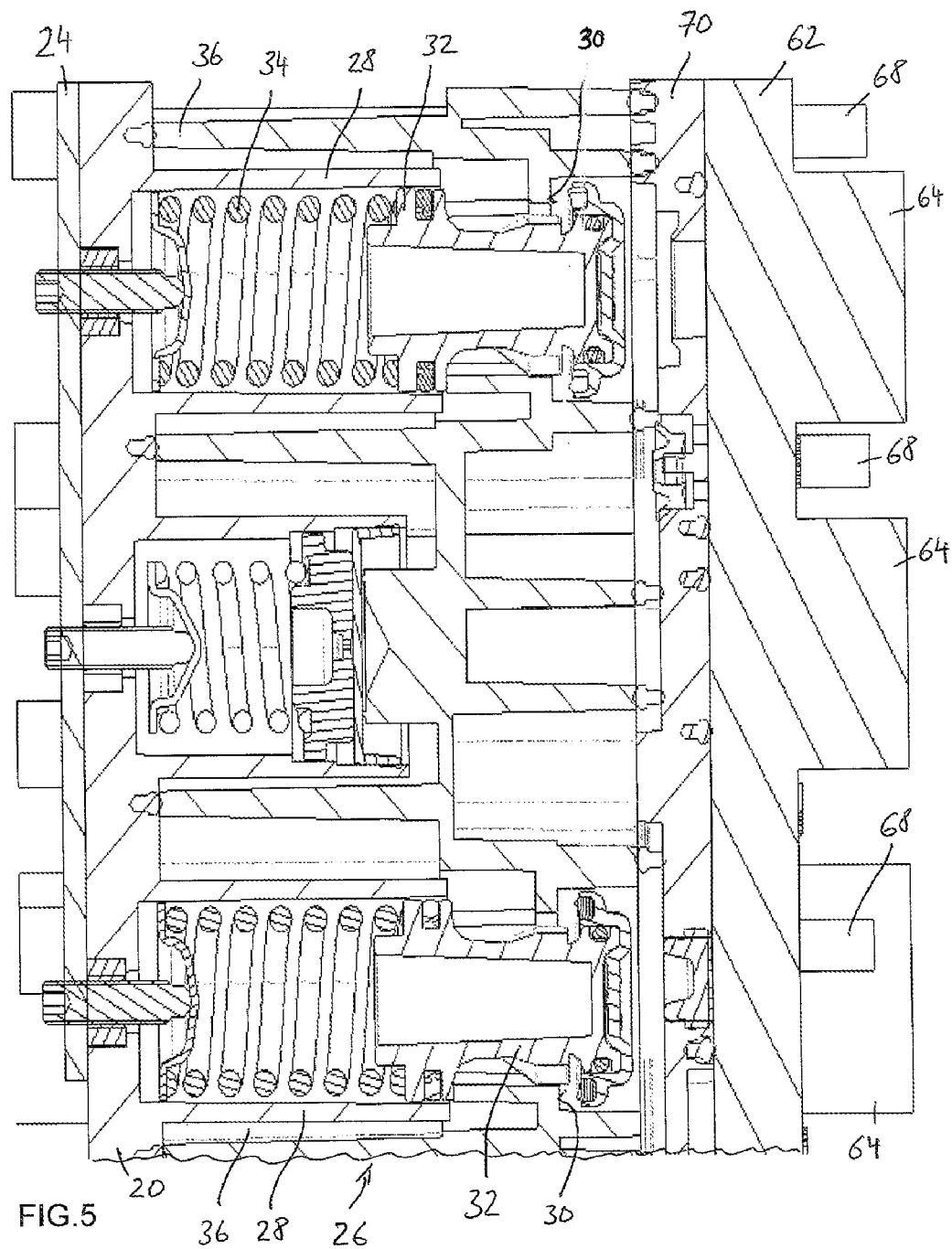
FIG. 5 shows a cross-sectional illustration of a part of the central housing of the compressed-air supply device from FIG. 4.

The second housing 22 has, as further housing component, a second valve block 36 of the valve device 26, having second valve domes 38 on which the valve seats 30 of the seat valves of the valve device 26 are preferably integrally formed, as emerges in particular from FIG. 5. The respective seat valve is in an open position when the valve body 32 is lifted from the valve seat 30, and is in a closed position when the valve body 32 is forced against the valve seat 30. The present situation involves for example a pressure-limiting valve which is pneumatically actuated. It is however also conceivable for the open or closed position of at least one of the seat valves there to be implemented magnetically, that is to say by energization or de-energization of one or more magnet coils.

Here, the second valve block 36 preferably likewise constitutes an injection-molded part composed of plastic. Furthermore, the first valve block 20 and the second valve block 36 constitute separate housing components of the second housing 22, as at least sections of their circumferential surfaces come into contact with the surroundings and they accommodate components, such as for example the valve bodies 32, in their interior.

The first valve domes 28 and the second valve domes 38 are, during the installation process, positioned relative to one another such that they at least partially project axially into one another and the valve seats 30 and valve bodies 32, which are assigned to one another, are in alignment with one another. Corresponding centering measures are provided for this purpose. This can be seen in particular in FIG. 3 and FIG. 5.

Figure 3:
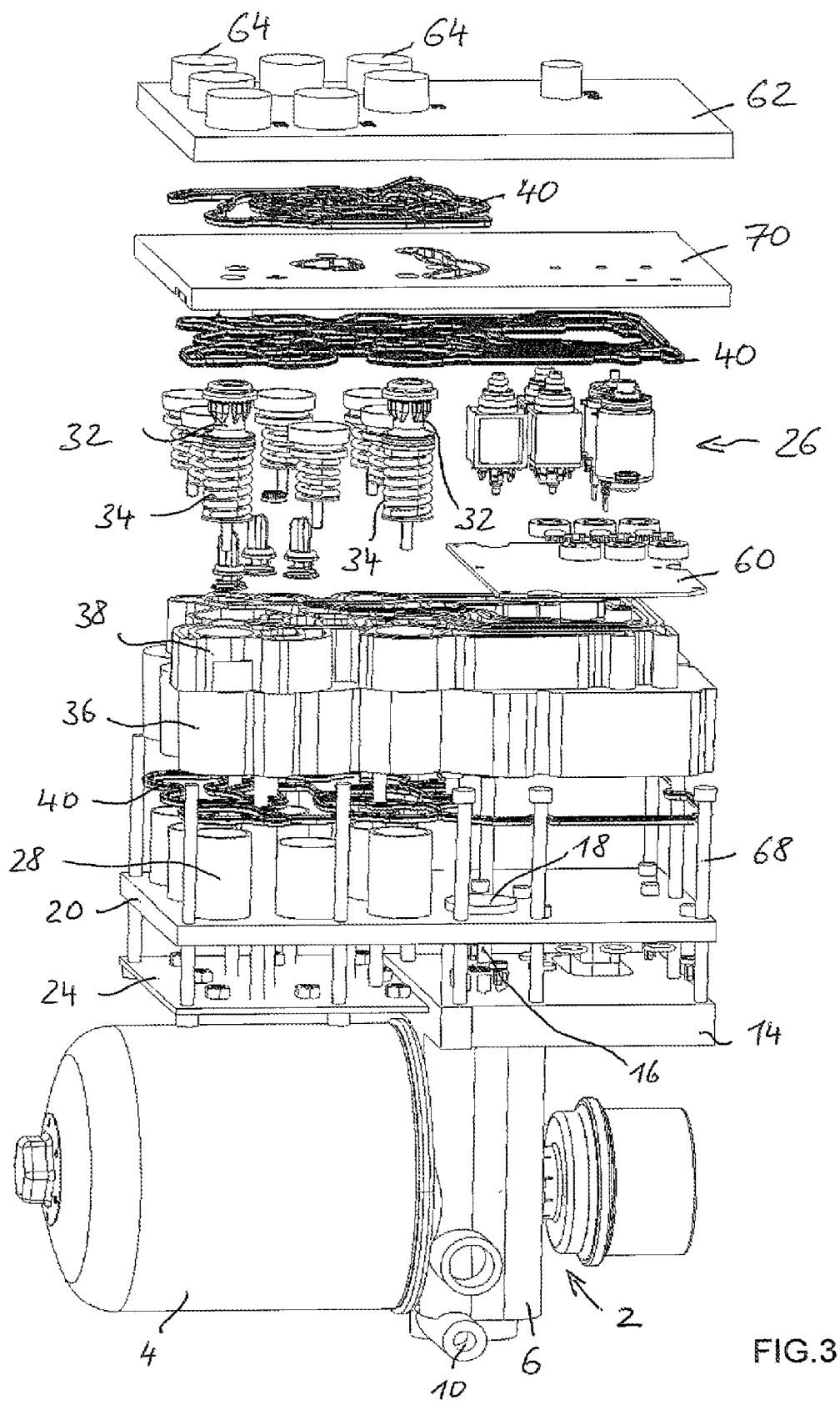
FIG. 3 shows a lateral exploded illustration of the compressed-air supply device from FIG. 1.
Figure 4:
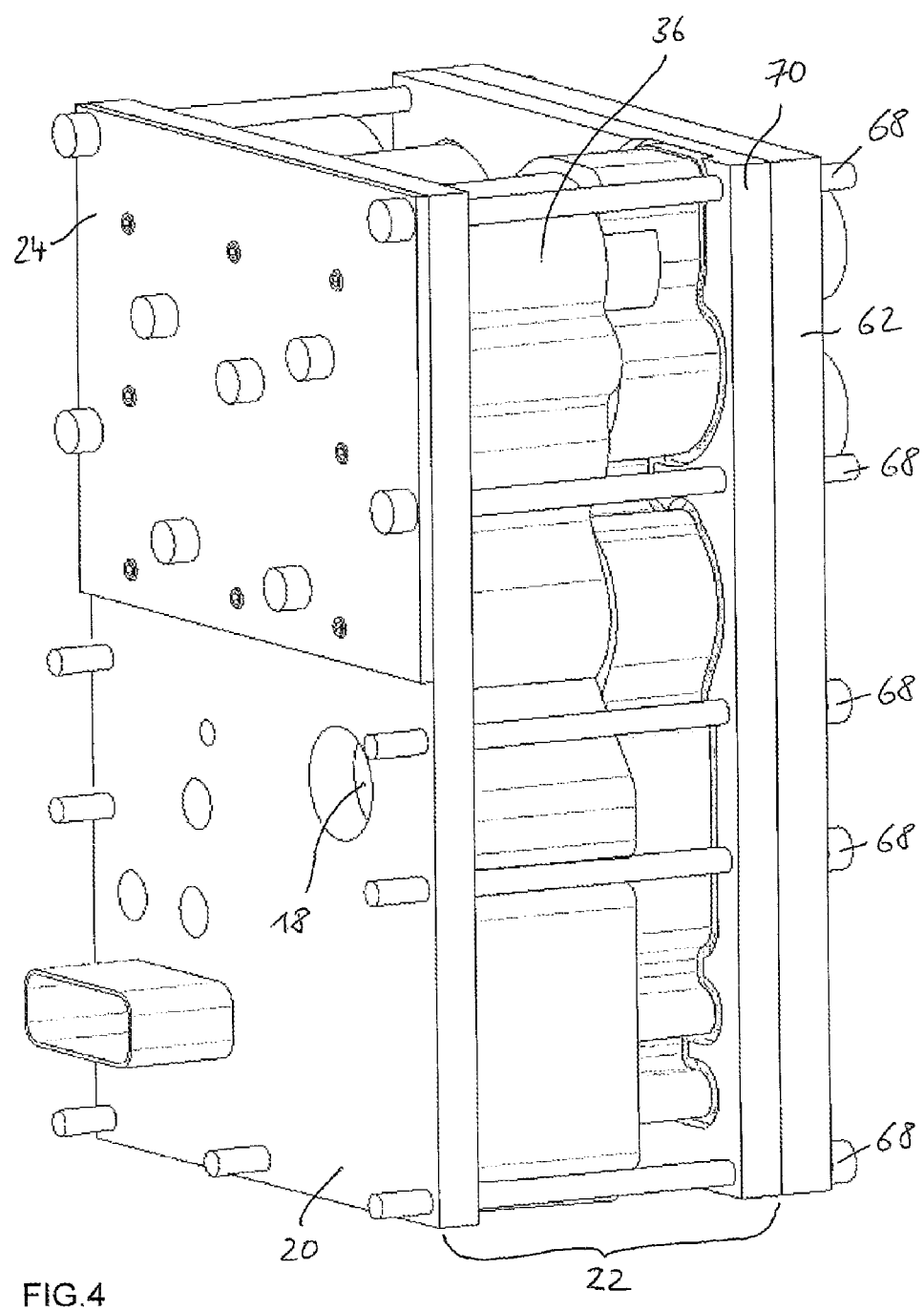
FIG. 4 shows a perspective view of a central housing of the compressed-air supply device from FIG. 1.

As can be seen from FIG. 3, molded seals 40 are positioned between some of the valve blocks or housings or housing components of the compressed-air supply device 1. Below, as an example, molded seals 40*a*, 40*b* and 40*c* between the first valve block 20 and the second valve block 36 will be considered, which molded seals are designed for example in each case as elastic, unipartite molded seals 40*a*, 40*b*, 40*c* composed of an elastomer.

Figure 6:
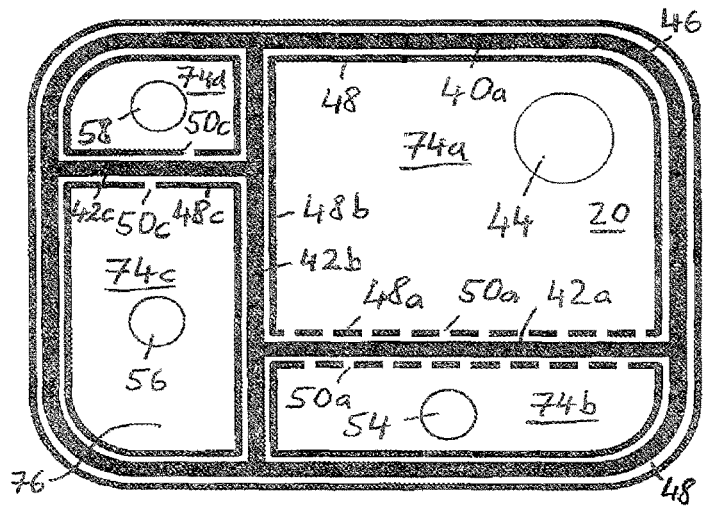
FIG. 6 shows a plan view of molded seals according to a first variant arranged between housings or housing components of the compressed-air supply device.
Figure 7:
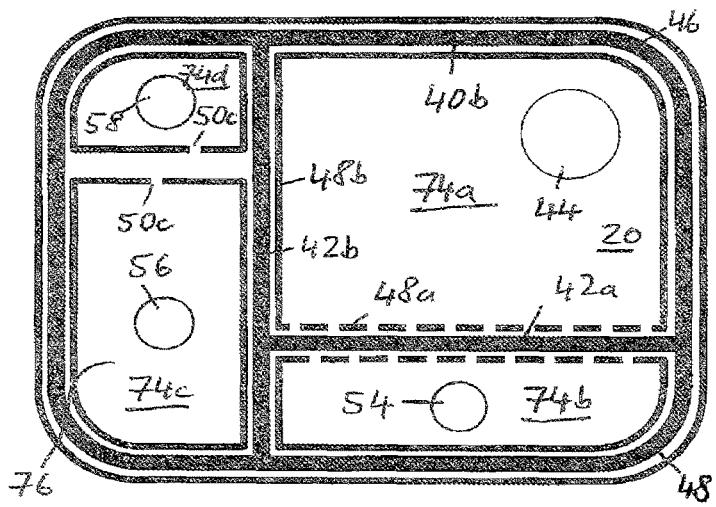
FIG. 7 shows a plan view of molded seals according to a second variant arranged between housings or housing components of the compressed-air supply device.
Figure 8:
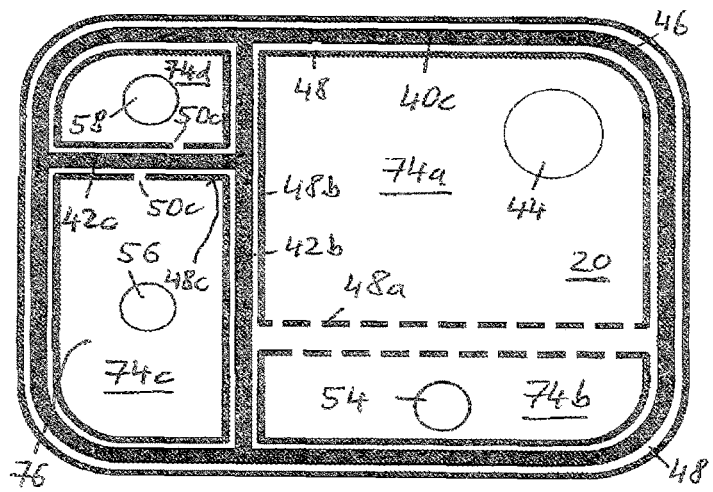
FIG. 8 shows a plan view of molded seals according to a third variant arranged between housings or housing components of the compressed-air supply device.

FIGS. 6 to 8 show a plan view of the first valve block 20 in the case of the second valve block 36 having been lifted off said first valve block, in order that the various molded seals 40*a*, 40*b* and 40*c* as exemplary embodiments of the invention can be better illustrated.

FIG. 6 shows a first variant 40*a* of a molded seal of said type. The molded seal 40*a* shown here by way of example has for example a ring part 46 and, for example, in this case three separating parts 42*a*, 42*b* and 42*c* which are preferably of web-like form. The separating parts 42*a*, 42*b* and 42*c* connect sections of the ring part 46 to one another and in each case separate chambers, in this case for example four chambers 74*a*, 74*b*, 74*c* and 74*d* in a plane parallel to a surface 76 of the first valve block 20 and a second surface 78 of the second valve block 36. The first surface 76 and the second surface 78 point toward one another and exert a preload on the molded seal 40*a* arranged between them, which preload elastically deforms said molded seal in order to ensure a sealing action between the chambers 74*a* to 74*d* and to the outside, as illustrated in particular in FIG. 9*b*. Here, the molded seal 40*a* has for example an elliptical or circular cross section and, in the installed or assembled state as per FIG. 9B, makes contact, under preload, at least with the first surface 76 and with the second surface 78. FIG. 9A illustrates a state in which the second valve block 36 has not yet been fully mounted on the first valve block 20, as a result of which the contact between the molded seal 40*a* and the second surface 78 has not yet been established.

FIGS. 9A and 9B also illustrate that a groove 48 which receives a ring part 46 or a separating part 42 of a molded seal 40 generally has two walls 48', 48" running parallel, which walls either are both connected to the first surface 76 of the first valve block 76 and project from the latter to the second surface 78 of the second valve block 36, as can be seen in FIG. 9a, or are both connected to the second surface 78 of the second valve block 36 and project from the latter to the first surface 76 of the second valve block 20. It is however also possible for the first wall 48' of a groove 48 to be connected to the first surface 76 of the first valve block 20 and for the second wall 48" of a groove 48 to be connected to the second surface 78 of the second valve block 36, and for a complete two-walled groove 48 to then be produced for the first time as a result of assembly of the two valve blocks 20, 36. The walls 48' and 48" which form a groove 48 may thus be connected either to the first surface 76 and/or to the second surface 78 and in particular formed in one piece therewith.

The molded seal 40a, that is to say the ring part 46 thereof and the separating parts 42a to 42c, are in this case held or secured in position in grooves 48, 48a, 48b and 48c, which in this case project for example from the first surface 76 of the first valve block 20. Here, the ring part 46 is held in an encircling ring groove 48, and the separating parts 42a to 42c are held in each case in a web-like groove 48, 48a, 48b, 48c. As can be seen from FIG. 6, the ring part 46 of the molded seal 40a preferably encloses all chambers 74a to 74d. Each of the chambers 74a to 74d is therefore, in a direction perpendicular to the plate plane of the first valve block 20 and of the second valve block 36, delimited at one side by the first surface 76 of the first valve block 20 and at the other side by the second surface 78 of the second valve block 36. Parallel to the plate plane of the first valve block 20 and of the second valve block 36, the chambers 74a to 74d are separated from one another by the ring part 46 of the molded seal 40a, 40b, 40c and by the respective separating part(s) 42a, 42b, 42c.

It is for example the case here that, in each of the chambers 74a to 74d, in each case one flow duct opens out preferably perpendicularly into the first surface 76 of the first valve block 20 at an associated first flow opening 44, second flow opening 54, third flow opening 56 and fourth flow opening 58. In this way, it is for example the case that each of the flow openings 44, 54, 56 and 58 is connected in terms of flow to a different chamber 74a to 74d in each case.

Instead of in this case only four flow openings 44, 54, 56 and 58, it would also be possible for more than four flow openings to be formed in the first surface 76 of the first valve block 20, which openings are connected in terms of flow to in each case one or more chambers 74a, 74b, 74c, 74d.

Instead of opening out only into the first surface 76 of the first valve block 20, it would also be possible for all of the flow ducts to open out by means of the flow openings 44, 54, 56 and 58 into the second surface 78 of the second valve block 36, or for one subset of the flow ducts to open out by means of flow openings into the first surface 76 of the first valve block 20 and for a further subset of the flow openings to open out by means of the flow openings into the second surface 78 of the second valve block 36. An example for the latter variant is shown in FIG. 10 where, for example, of two flow openings 44a, 44b which open for example into the chamber 74a, one flow opening 44a is formed in the second valve block 36 and a further flow opening 44b is formed in the first valve block 20. Furthermore, there, the second flow opening 54 is formed on the second surface 78 of the second valve block 36. Which of the two surfaces 76 or 78 the flow openings 44, 54, 56 and 58 open out in, and in what number said flow openings open out, are therefore not of importance. It is therefore crucial merely that at least two of the chambers 74a, 74b, 74c and 74d are connected in terms of flow to a flow opening 44, 54, 56 and 58 and to the flow duct respectively assigned thereto.

The groove 48a between the chamber 74a and the chamber 74b has in this case for example multiple apertures 50a, in the same way as the groove 48c between the chamber 74d and the chamber 74c has multiple apertures 50c. Said apertures 50a, 50c run for example perpendicular to the walls of the grooves 48a and 48c and, if no separating part 42a or 42c is provided there in the molded seal 40b or 40c, produce a flow connection between the chambers 74a and 74b and between the chambers 74c and 74d respectively, as illustrated in FIG. 7 and FIG. 8. Since separating parts 42a and 42c are however provided in the case of the molded seal 40a of FIG. 6, said flow connections, which are then only theoretically possible, are not provided.

Meanwhile, in the case of the molded seal 40b of FIG. 7, the separating part 42c is omitted, such that in that case a flow connection exists between the chambers 74c and 74d or between the third flow opening 56 and the fourth flow opening 58. Since the molded seal 40b of FIG. 7 is otherwise identical to the molded seal 40a of FIG. 6, the chambers 74a, 74b remain separated from one another by the separating part 42a, such that no flow connection exists between the first flow opening 44 and the second flow opening 54.

By contrast, the molded seal 40c of FIG. 8 has the separating part 42c, such that it is duly the case that no flow connection exists between the chambers 74c and 74d or between the third flow opening 56 and the fourth flow opening 58. In contrast, in the case of the molded seal 40c of FIG. 8, the separating part 42a is omitted, such that a flow connection exists between the chambers 74a and 74b or between the first flow opening 44 and the second flow opening 54.

Figure 11:
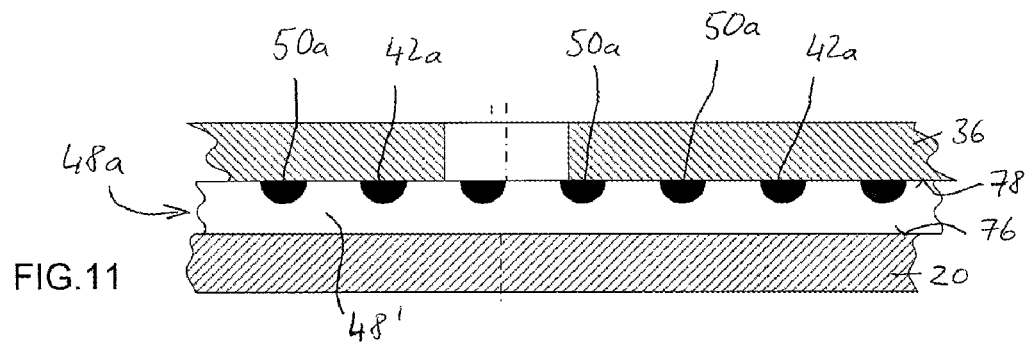
FIG. 11 shows a cross-sectional illustration of the compressed-air supply device according to a further embodiment longitudinally with respect to a groove which receives a separating part of a molded seal.

FIG. 11 shows a view of the embodiment of FIG. 6 in a direction parallel to the two surfaces 76, 78 of the two valve blocks 20, 36. There, it can be seen that the walls 48', 48" of the groove 48a have preferably multiple overlapping apertures 50a, which in this case are for example of semicircular form. When, by contrast to FIG. 6, no separating part 42a is situated in the respective groove 48a, the apertures 50a form flow ducts between the adjacent chambers 74a and 74b, wherein the total flow cross section is formed by the sum of the cross sections of the semicircular apertures 50a. From FIG. 11, it is easily conceivable that, when no separating part 42a is situated in the groove 48a, as is the case with the molded seal of FIG. 8, the apertures 50a then permit a flow between the chambers 74a and 74b.

Figure 12:
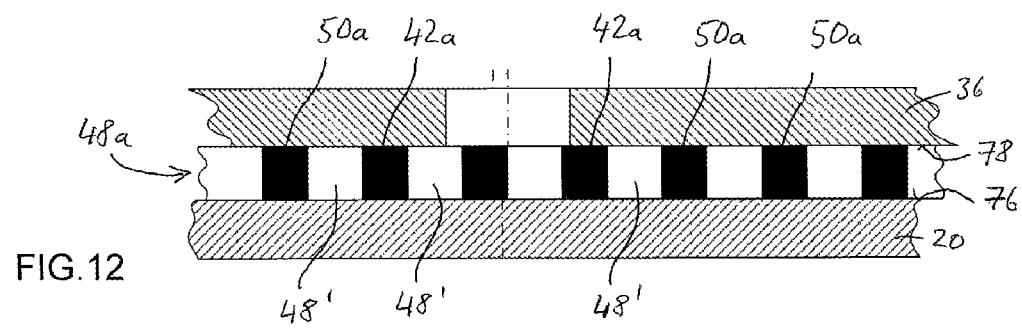
FIG. 12 shows a cross-sectional illustration of the compressed-air supply device according to a further embodiment longitudinally with respect to a groove which receives a separating part of a molded seal.

A further embodiment of apertures 50a in a groove 48a or in the walls 48', 48" thereof is shown in FIG. 12. There, the apertures 50a are for example rectangular and extend for example from the first surface 76 all the way to the second surface 78. As a result, the walls 48' and 48" of the groove 48a are composed for example of individual elements which are preferably arranged so as to be uniformly spaced apart from one another in the direction of the groove 48a and which extend in the manner of teeth and perpendicularly away from the first surface 76 in the direction of the second surface 78. It is also conceivable here for tooth-like elements of said type to extend, as viewed in the direction of the groove 48a, alternately from the first surface 76 and from the second surface 78 and to then engage in each case into the intermediate spaces formed between the teeth of the respectively oppositely situated surface 76 or 78.

Figure 13:
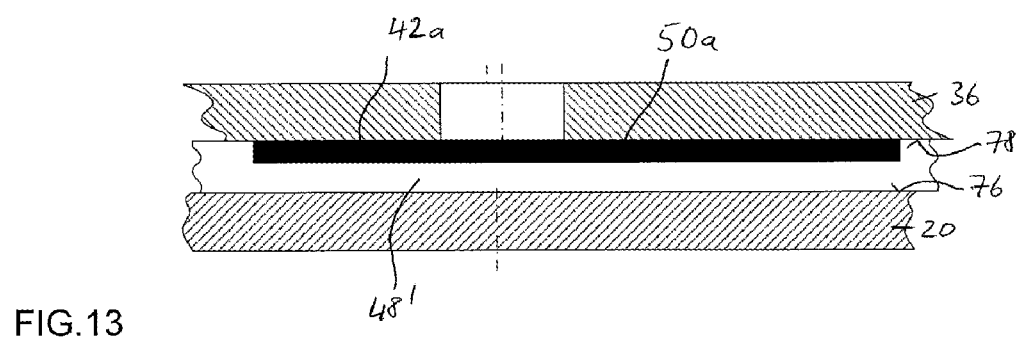
FIG. 13 shows a cross-sectional illustration of the compressed-air supply device according to a further embodiment longitudinally with respect to a groove which receives a separating part of a molded seal.

In the embodiment of FIG. 13, it is for example the case that only one rectangular aperture 50a is provided, for example at the free edges of the walls 48', 48" of the groove 48a. This embodiment corresponds to the embodiment shown in FIG. 10, merely in a perpendicular viewing direction, in which the rectangular aperture 50a can be seen as a gap.

The embodiments of FIG. 11 to FIG. 13 show that the cross section of the apertures 50a, 50b, 50c is not of importance. It is crucial merely that they provide a free flow cross section from one chamber 74a, 74b, 74c, 74d into another chamber 74a, 74b, 74c, 74d if no separating part 42a, 42b, 42c is provided in the respective groove 48a, 48b, 48c.

It is thus possible for different flow connections between the flow ducts assigned to the flow openings 44, 54, 56, 58, or between the chambers 74a, 74b, 74c and 74d, to be created or shut off in a manner dependent on the selection of a molded seals 40a, 40b or 40 from a predefined group of molded seals which have separating parts 42a, 42b, 42c at different positions. Thus, a different pneumatic switching configuration within the compressed-air supply device 1 is realized in a manner dependent on the selection of a molded seal 40a, 40b or 40c from a predefined group of molded seals.

By replacing the molded seal 40a in FIG. 6 with the molded seal 40b as per FIG. 7 or with the molded seal 40c as per FIG. 8 with a respectively different absent separating part 42c or 42a or different absent separating parts, it is thus possible to realize different flow connections between the flow openings 44, 54, 56, 58 and the associated flow ducts thereof in the first valve block 20 and/or in the second valve block 36.

The ring grooves 48, 48a, 48b and 48c may all, as is the case here, be arranged on one surface, in this case the first surface 76, or may be arranged alternately or in sections on the first surface 76 and on the second surface 78, such that a type of toothing is realized when the first valve block 20 is connected to the second valve block 36. Alternatively, it is also possible for all ring grooves 48, 48a, 48b and 48c to be arranged on, and project from, the second surface 78.

As can be seen most clearly from FIG. 3, open-loop and closed-loop control electronics 60 are also arranged in the second housing 22, which electronics, by means of implemented open-loop and closed-loop control software, perform open-loop and/or closed-loop control of preferably all functions of the compressed-air supply device 1, inter alia also the parking brake function and/or the air suspension function, as already mentioned above. A circuit board comprising the open-loop and closed-loop control electronics 60 is in this case fastened for example to that side surface of the second valve block 36 which points away from the first valve block 20.

Figure 2:
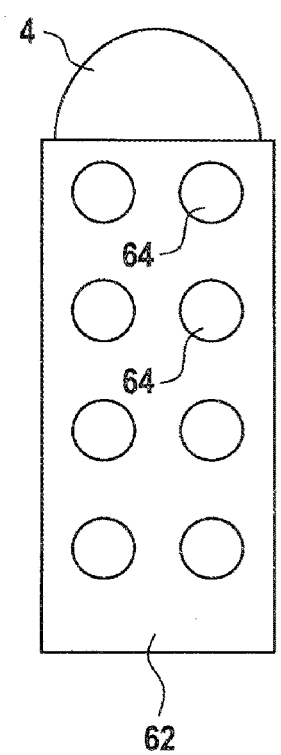
FIG. 2 shows a rear view of the compressed-air supply device from FIG. 1.

The second housing 22, or inter alia the first valve block 20 and the second valve block 36, are held between the first housing 6 and a third housing 62, which preferably likewise constitutes an aluminum diecast part, wherein an assembly composed of the first housing 6, the second housing 22 and the third housing 62 is formed. The third housing 62 is preferably of plate-like form, wherein connectors 64 for pipes and/or lines of the compressed-air consumer circuits are formed on that surface of said third housing which points away from the second housing 22, as can be seen in particular from FIG. 2 and FIG. 3.

Said connectors 64 consist for example in pipe stubs formed in one piece with the third housing 62 by primary forming, in the openings of which pipe stubs there are formed internal threads for corresponding external threads of fittings of the connected pipes and lines. On the third housing 62 there is furthermore formed a fastening apparatus 66 for the fastening of the compressed-air supply device 1 to the frame of the utility vehicle, for example in the form of one or more threaded eyelets. Consequently, the preferred exemplary embodiment of a compressed-air supply device 1 described here is preferably held on the frame of the utility vehicle only at the first housing 6 and at the third housing 62 by means of corresponding fastening apparatus 12, 66, whereas the second housing 22 has no such fastening apparatus. It would also alternatively be possible for the compressed-air supply device 1 to be held by means of only the fastening apparatus 12 on the first housing 6 or the fastening apparatus 66 on the third housing 62, which then results in an overhanging position.

As shown in particular in FIG. 3, the second housing 22 is held between the first housing 6 and the third housing 62 by means of tension anchors 68 which are secured firstly in the first housing 6 and secondly in the third housing 62. Since, in relation to the plane of the connector plate 14 of the first housing 6, the two valve blocks 20, 36 and the third housing 62 extend laterally beyond said connector plate 14, the tension anchors 68 are also anchored in the standing plate 24. The connector plate 14, the two valve blocks 20, 36 and the plate-like third housing 62 are furthermore preferably arranged parallel, giving rise to a compact structural form.

As shown in particular in FIG. 3, the second housing 22 additionally comprises an intermediate plate 70, which is arranged between the second valve block 36 and the third housing 62 and which has openings or flow ducts which connect openings or flow ducts in the second valve block 36 to openings or flow ducts in the third housing 62, the latter openings or flow ducts being connected to the connectors 64 for the compressed-air circuits of the compressed-air consumers. The intermediate plate 70, which likewise constitutes an injection-molded article composed of plastic and which is arranged parallel to the connector plate 14, to the two valve blocks and to the plate-like third housing, serves for the mounting or securing firstly of components of at least some valves of the valve device 26 which project through openings of the second valve domes 38 in the second valve block 36. Said components are for example valve seats, which are then formed integrally in the intermediate plate 70 and are formed with the latter by primary forming.

Secondly, the intermediate plate 70 produces flow paths and flow ducts between valves of the valve device 26 and the connectors 64 for the compressed-air consumer circuits. In particular, groove-like flow paths may be formed firstly on that surface of said intermediate plate which faces toward the second valve block 36 and secondly on that surface of said intermediate plate which faces toward the third housing 62, and flow ducts which connect said flow paths to one another may be formed in the interior of said intermediate plate. Said flow paths or flow ducts are preferably formed integrally together with the intermediate plate 70 by primary forming in an injection molding process.

As is already provided between the valve blocks, it is likewise the case that molded seals 40 are positioned with sealing action between the second valve block 36 and the intermediate plate 70 and between the intermediate plate 70 and the third housing 62, which molded seals, by means of their closure parts 42, sealingly close at least one opening or one flow duct of the intermediate plate 70. The seal parts 46 of the molded seals 40 are in turn likewise guided and fixed in grooves in the second valve block 36, in the intermediate plate 72 and in the third housing 62. Then, certain flow paths are closed or opened up in a manner dependent on the positioning or design of the respective molded seal 40.

Here, the second housing 22 therefore comprises the two valve blocks 20, 36 and the intermediate plate 70 and also the molded seals 40, wherein it is preferable for all of said components to be manufactured from plastic or from elastomer. It is preferable for thermoplastic materials, preferably semicrystalline thermoplastic materials, to be used as plastics, for example with relatively thin walls of up to 2.5 mm wall thickness, preferably with or without glass fiber reinforcement. Said parts 20, 36, 70 are preferably produced in an injection molding process. It is alternatively or additionally also possible for thermosets to be used, in particular in order to realize thick-walled parts 20, 36, 70 with a wall thickness of greater than 2.5 mm.

By contrast, the first housing 6 and the third housing 62 are composed of metal, preferably of aluminum, wherein connectors 10, 64 at least for the compressor and the compressed-air consumer circuits are preferably formed integrally on said housings 6, 62 by primary forming, because the connectors 10, 64, which are formed for example as pipe stubs with internal threads, must satisfy greater demands with regard to strength and stiffness.

Furthermore, on the first housing 6 and on the third housing 62, the fastening apparatuses 8, 68 for the fastening of the compressed-air supply device 1 to the frame of the utility vehicle are also composed of metal, because relatively great demands with regard to stiffness and strength are placed on said fastening apparatuses too.

Therefore, in the compressed-air supply device 1, metal housings or metal components are used only where the typically high strength and stiffness of metals can be advantageously utilized, for example as a composite material of a composite of metal and plastics housings or housing components 20, 36, 70, in which the second housing 22 composed of plastics housing components is held in a sandwich type of construction between the first housing 6 composed of metal and the third housing 62 composed of metal, and the transmission of force and introduction of force from the composite or from the sandwich construction into the structure of the motor vehicle are realized for example exclusively through the first housing 6 and third housing 62, which are composed of metal.

It is thus possible for plastics of relatively low strength (tensile strengths <200 N/mm2, but higher compressive strength) to be utilized for the second housing 22 which is encompassed or engaged around by the first housing 6 and the third housing 62, or for the housing components 20, 36 and 70 of said second housing, because then, a major part of the operational and weight forces is accommodated by the metallic first housing 6 and the metallic third housing 62.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

1 Compressed-air supply device
2 Air dryer device
4 Air dryer cartridge
6 First housing
8 Fastening apparatus
10 Connector
12 Fastening apparatus
14 Connector plate
16 Flow opening
18 Flow opening
20 First valve block
22 Second housing
24 Standing plate
26 Valve device
28 First valve domes
30 Valve seat
32 Valve body
34 Compression springs
36 Second valve block
38 Second valve domes
40 *a/b/c* Molded seal
42 *a/b/c* Separating parts
44 First flow opening
46 Ring part
48 *a/b/c* Grooves
50 *a/c* Apertures
54 Second flow opening
56 Third flow opening
58 Fourth flow opening
60 Open-loop and closed-loop control electronics
62 Third housing
64 Connectors
66 Fastening apparatus
68 Tension anchor
70 Intermediate plate
72 Valve seat
74 *a/b/c/d* Chamber
76 First surface
78 Second surface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure medium device of a vehicle, in which pressure medium device a pressure medium flows, having a multi-layer construction which has at least two layers which make contact with one another, wherein, of at least two flow openings of in each case one flow duct for the pressure medium, both flow openings open out in a first surface of a first layer of the layers which make contact with one another, or a first flow opening opens out in the first surface and a second flow opening opens out in a second surface, which is situated opposite the first surface, of a second layer, which adjoins the first layer, of the layers which make contact with one another, comprising:

at least one groove-shaped receptacle, which projects from the first surface and/or from the second surface, for at least one separating part of a molded seal arranged between the two layers, wherein the groove-shaped receptacle is, as viewed in a plane parallel to the layers, arranged between a first chamber, into which the first flow opening opens out, and a second chamber, into which the second flow opening opens out, wherein the first chamber and the second chamber are delimited at least by the first surface and by the second surface, wherein
   a) the groove-like receptacle has at least one aperture for a flow connection between the first chamber and the second chamber in a plane parallel to the layers,
   b) a group of molded seals for installation between the two layers is provided, wherein a first molded seal from the group of molded seals has, at least in the region of the aperture, a separating part, which is received in the groove-shaped receptacle, for separating the first chamber from the second chamber, and a second molded seal from the group of molded seals is, at least in the region of the aperture, formed without such a separating part, and c) a flow connection between the first chamber and the second chamber is produced, or is not produced, in a manner dependent on the molded seal respectively selected from the group of molded seals and installed between the two layers.

2. The pressure medium device as claimed in claim 1, wherein at least one of the layers is of plate-shaped form.

3. The pressure medium device as claimed in claim 1, wherein
at least one of the layers constitutes a housing or a housing component of the pressure medium device.

4. The pressure medium device as claimed in claim 1, wherein
the separating part is of web-shaped form and, separating the first chamber from the second chamber, connects sections of an encircling ring part, which surrounds at least the first chamber and the second chamber, of the molded seal to one another.

5. The pressure medium device as claimed in claim 4, wherein the ring part is formed in one piece with the separating part.

6. The pressure medium device as claimed in claim 5, wherein
the ring part is received in an encircling groove-shaped receptacle which projects from the first surface and/or from the second surface.

7. The pressure medium device as claimed in claim 6, wherein
the molded seal is composed of an elastomer.

8. The pressure medium device as claimed in claim 5, wherein
the molded seal is composed of an elastomer.

9. The pressure medium device as claimed in claim 4, wherein
the ring part is received in an encircling groove-shaped receptacle which projects from the first surface and/or from the second surface.

10. The pressure medium device as claimed in claim 4, wherein
the molded seal is composed of an elastomer.

11. The pressure medium device as claimed in claim 1, wherein
between the two layers, there are provided multiple chambers which are separated from one another or connected to one another in each case by a present or absent separating part of a molded seal selected from the group of molded seals.

12. The pressure medium device as claimed in claim 1, wherein the molded seal is held under preload between the first surface and the second surface.

13. The pressure medium device as claimed in claim 1, wherein the pressure medium is formed by compressed air.

14. The pressure medium device as claimed in claim 13, wherein
said pressure medium device comprises a compressed-air supply device for vehicle compressed-air systems, comprising, as components or assemblies, at least one air dryer device with an air dryer cartridge, a valve device with a multi-circuit protection valve and possibly further valves, a pressure limiter, open-loop and closed-loop control electronics, and multiple layers or housing components in or on which the abovementioned components or assemblies are accommodated.

15. The pressure medium device as claimed in claim 13, wherein
said pressure medium device further comprises a pneumatic or electropneumatic brake device, a pneumatic or electropneumatic air suspension device, or a pneumatic or electropneumatic door actuation device.

16. A vehicle comprising a pressure medium device as claimed in claim 1.

\* \* \* \* \*